Patented Sept. 17, 1929

1,728,828

UNITED STATES PATENT OFFICE

JEAN JOSEPH HENDRICKX, OF PARIS, FRANCE, ASSIGNOR TO SOCIETE ANONYME ETABLISSEMENTS POLIET & CHAUSSON, OF PARIS, FRANCE, A FRENCH COMPANY

PROCESS FOR THE INDUSTRIAL MANUFACTURE OF ARTIFICIAL PORTLAND CEMENT

No Drawing. Application filed May 18, 1925, Serial No. 31,212, and in France February 6, 1925.

The production of artificial Portland cements rapidly hardening, presenting at the end of 48 hours of hardening a resistance to compression of the order of magnitude of 300 to 400 kilograms for normal plastic mortar, and 400 to 600 kilograms for dry beaten up mortar, has been obtained up to now but with great difficulty and very irregularly, in the normal conditions of manufacture by the known industrial processes.

Notwithstanding all the pains taken for determining the suitable proportions of the raw elements and their burning in a rotary kiln, the clinker (slagged cement) which has a very high value, is produced, in practice, but accidentally and the cause of the failure has not been exactly determined up to this day.

The microscopic examination of thin lamellæ cut in industrially produced clinkers shows that the active hydraulic elements (called crystals of alite) are usually disseminated in small groups in immense inert zones, complex compounds without any hydraulic property. It results therefrom that the proportion of active elements in industrial cement is relatively small and that the amelioration of the fineness of grinding cannot materially increase the hydraulic properties of the finished product, a large fraction of the grinding stress being exerted on an inert material, which, more finely ground, contributes prejudiciously to increase the proportion of water necessary for the mixing.

It has not been possible to give a plausible reason explaining the presence of these inert zones; the cause remaining unknown, nor has it been possible to indicate an efficient remedy and a really industrial process permitting the production of clinker of very high value in an absolutely regular manner.

Long observations and experiments have proved to the inventor that the irregular crystallization of the clinker was due to the alteration of the homogeneity of the raw mixture by the ashes of the pulverized coal heating the rotary kiln and which have the same composition as clay. By burning coal giving 15% of ashes, about 4% of complementary clayey elements are thus mixed with the cement during burning, in the ordinary conditions of operation of the kilns, notwithstanding that in the preparation of the raw mixture, it has been endeavoured to regulate the proportion of clay to within a tolerance of a few tenths per cent. Even, by the use of very pure coal reducing this adulteration, the alteration due to ashes is still much too important for normally obtaining a precise regular crystallization.

The influence of ashes is particularly prejudicial because their addition to the cement is not regularly effected, in so far as the proportion and homogeneity of their distribution are concerned.

According to the proportion of coal burnt, its content in ashes, the composition of the latter and the working of the kiln, the alteration of the average composition of the cement is quite variable. The distribution is still more variable because the ashes are deposited at random throughout the length of the kiln. According to the state of progress of the treatment of the material to be burnt, its alteration is successively manifested: 1—in the midst of the liquid paste; 2—at the surface of the wet heaps; 3—at the surface of the granules in course of decarbonation or in course of drying; 4—at the surface of the granules in full burning period.

For contending with this alteration, the inventor proposes the practically efficient means which consists in insufflating lime (CaO) with the coal (mixed or not with the coal and preferably ground according to the same fineness as the latter) in the form of quick or hydrated lime or of limestone, in the proportions necessary for converting the ashes into a cement mixture, according to the ordinary formula serving for the composition of the raw-mixture.

The mixture of ashes and lime thus insufflated in the kiln is deposited therein on the cement without altering it, considering each clayey particle of the ashes finds the calcareous elements necessary for its conversion into cement.

A kiln operating in this manner presents a particular aspect in the melting zone which proves that the influence of the ashes is practically eliminated, in that the burning can be pushed farther without any premature and exaggerated agglutination of the material to be burnt so that the operator, to whom agglutination of the mass serves as a guide, can be assured that the burning has been carried to completion when the agglutination begins.

The observation with the microscope of the clinker produced shows an extremely regular and very dense crystallization. The cements thus obtained have very high resistances to structural failure.

An auxiliary and fortunate consequence resulting from the invention is the elimination of the principal cause of the formation of the annular cloggings which obstruct the kilns and can be attributed to the melting action of the ashes on the fine particles of material in course of burning.

What I claim as my invention and desire to secure by Letters Patent is:

In a process for manufacturing Portland cement, which consists in mixing the raw ingredient materials, introducing the mixture obtained in a rotary furnace, and roasting the said mixture in the said furnace, by means of pulverized fuel burning within the said furnace, the step which consists in adding lime to the pulverized fuel used.

In testimony whereof I have signed my name to this specification.

JEAN JOSEPH HENDRICKX.